United States Patent [19]

Hostettler et al.

[11] 3,853,446

[45] Dec. 10, 1974

[54] LIQUID INJECTION MOLDING APPARATUS

[75] Inventors: Fritz Hostettler, Freehold; Peter U. Graefe, Bricktown, both of N.J.

[73] Assignee: Inter Polymer Research Corporation, Farmingdale, N.J.

[22] Filed: Apr. 17, 1973

[21] Appl. No.: 352,076

[52] U.S. Cl.............................. 425/217, 425/242 R
[51] Int. Cl............................ B29c 29/00, B29f 1/00
[58] Field of Search ........... 425/217, 216, 215, 447, 425/130, 145, 245, 147, 242, 159; 264/329, 244, 102, 240; 259/7–10

[56] References Cited
UNITED STATES PATENTS

| | | | |
|---|---|---|---|
| 2,974,830 | 3/1961 | Hood | 259/7 X |
| 3,067,987 | 12/1962 | Ballou et al. | 259/7 |
| 3,123,342 | 3/1964 | Little | 259/7 X |
| 3,154,618 | 10/1964 | Baer et al. | 425/245 X |
| 3,180,350 | 4/1965 | Rill et al. | 259/7 X |
| 3,315,317 | 4/1967 | Winkler | 425/130 X |

*Primary Examiner*—Francis S. Husar
*Assistant Examiner*—David B. Smith
*Attorney, Agent, or Firm*—Watson, Leavenworth, Kelton & Taggart

[57] ABSTRACT

In an apparatus for the liquid injection molding of multi-component thermosetting reaction mixtures having holding tanks for storing each component of the reaction mixture under vacuum, recirculating and metering pumps for recirculating each component to its respective holding vessel between injection cycles and alternately delivering metered amounts of each component to a mixing and injecting unit during the injection cycle and a mold having an internal configuration or cavity conforming to the surfaces of the article to be molded, a movable bottom plate and an injection port and short injection channel terminating in a gate positioned within the mold cavity at a point relatively remote from the geometric center or point of balance of the bottom plate for molding the reaction mixture to the desired configuration, an improvement is disclosed which comprises:

a. means for continuously recirculating one part of each reaction component to its respective holding tank while simultaneously delivering the other part of the reaction component to a metering, mixing, and injecting unit for injecting a predetermined amount of homogeneous reaction mixture into the injection port of a mold under substantially constant pressure only for the duration of the injection cycle;

b. means for permitting discharge of the reaction mixture from the metering, mixing, and injecting unit into the injection port of the mold only for the duration of the injection cycle;

c. means for maintaining substantially constant pressure for that part of the reaction component being recirculated to its respective holding tank regardless of the state of operation of means (b); and d. at least one injection channel extending from the injection port of the mold and terminating in at least one gate positioned within the mold cavity at a point relatively proximate to the geometric center or point of balance of the bottom plate, the injection channel being defined within the wall of the mold cavity at a level below the upper surface of the bottom plate when the bottom plate is in the position for the commencement of the injection cycle with the bottom plate wall serving as one wall of the injection channel, or the injection channel is defined within the bottom plate wall with the wall of the mold cavity serving as one wall of the injection channel, or the injection channel is defined within the wall of the mold cavity anda the bottom plate wall in the aforesaid manner with the flow of reaction mixture through the gate during the injection cycle being uninterrupted when the bottom plate is in position for the commencement of the injection cycle and interrupted when the bottom plate is in the position at the conclusion of the injection cycle.

6 Claims, 7 Drawing Figures

LIQUID INJECTION MOLDING APPARATUS

BACKGROUND OF THE INVENTION

I. Field of the Invention

This invention relates to the field of apparatus and processes employed for the liquid injection molding of thermoplastic and thermosetting resins and in particular, for the liquid injection molding of polyurethane elastomers.

II. Description of the Prior Art

Known and conventional apparatus and processes for the liquid rejection molding of non-foaming, i.e., compact or solid polyurethane elastomers require demolding times in excess of one minute. With degassing of the reactive components, such processes require demolding times of not less than 7 minutes and generally require demolding times on the order of about 15 to 30 minutes. While demolding times can be considerably reduced by molding products with thermoplastic polyurethanes employing processes which are basically similar to well-known thermoplastic injection molding processes, the resulting products will not have the same desirable physical properties as their liquid injection molded counterparts nor can the molding compositions for the former be readily formulated to demonstrate preselected properties in the finished products.

In one known process for the liquid injection molding of a polyurethane elastomer, a degassed isocyanate prepolymer and substantially pure MOCA (4,4' - methylenebis (2-chloroaniline)) is injected and results in demolding times somewaht in excess of about 7 minutes. However, due to the relative instability of substantially pure MOCA and its high melting point, the process presents difficult control problems.

Other known processes for liquid injection molding of polyurethanes recirculate degassed polyurethane reaction components under vacuum to their respective holding tanks and during the injection cycle by means of three-way valves, the same pumps employed for recirculating are used for pumping metered amounts of the reaction components to the mixing/injecting unit. since, in operation, the three-way valves must be completely closed even if only for a brief moment, head pressure is built up and upon opening of the valve, the pressure will be relieved causing a surge of reaction components to the mixing/injection unit. This phenomenon results in the injection into the mold of a greater amount of one reactant to the other at the very start of the injection cycle. Obviously, errors in the quantitative aspects of the polyurethane reaction make it difficult to precisely and predictably control the reaction, and therefore, the characteristics of the resulting elastomers.

While surge can be offset to some extent by manipulating other elements of the system, it represents a problem which is not conveniently nor completely eliminated.

while it is theoretically possible to employ separate recirculating pumps and a separate pump for metering and mixing the polyurethane reaction components and thereby avoid any surge, due to the technical difficulty of starting the pumps at exactly the same moment and precisely matching the pumps' output curves, such a system offers little in the way of a practical solution to the problem of surge.

Accordingly, it is desirable and advantageous to have apparatus and processes for vacuum-storing relatively large quantities of degassed polyurethane reaction components and precisely metering, mixing, and injecting the components into any suitable injection molding machines as for example, the conventional multi-station molding machines known as a roundtable, while avoiding any metering errors due to surge.

Another difficulty in known and conventional liquid injection molding systems is presented by the mold.

A mold which has been commercially used for the injection molding of polyurethane elastomer ski-boot shells is fairly representative of the molds in use heretofore and will be described further. The mold is of the so-called "clamshell" type and is provided with two halves with the interior of each half defining one side of the ski-boot shell, a foot-shaped last occupying the central cavity of the mold when the two halves of the mold are joined together and a sole-shaped bottom plate which can be moved upward a distance of about 10 to 15 mm toward the central cavity of the assembled mold by any appropriate means, e.g., mechanical, hydraulic, or penumatic means. An injection port, a short injection channel or runner and gate are defined within the heel section of the assembled mold. The injection channel is designed to be as short as possible in order to avoid unnecessary material waste. As a result, the gate is positioned within the mold cavity at a point which is relatively remote from the geometric center or "point of balance" of the bottom plate. Molds are known in which the gate is located at the geometric center of the bottom plate; however, such molds are useful only in thermoplastic systems. Were a mold of this type to be employed for thermosetting systems, such as polyurethane elastomer liquid injection molding systems, some of the cured elastomer would block the injection channel and gate and could not be readily or conveniently removed.

In operation, at the start of the injection cycle, the bottom plate of the above-described mold is in its lowest position, thus exposing the gate to the mold cavity. The polyurethane reaction mixture is injected into the mold through the gate lengthwise of the bottom plate for a period of from about 25 to 35 seconds with thirty seconds being average. The reaction mixture will then occupy approximately two-thirds to three-fourths of the mold cavity. At the end of the injection cycle, the bottom plate is advanced upward simultaneously blocking the gate and creating a pressure which forces the reaction mixture into the uppermost portion of the mold cavity and any other unoccupied places within the mold. Upon completion of curing, the two halves of the mold are separated, the ski-boot shell removed from the last and the small amount of cured material present in the injection channel is removed thereby readying the mold for the next cycle.

Use of the aforedescribed mold is subject to several disadvantages. The diameter of the gate cannot be made to exceed the distance through which the bottom plate is made to travel upward for otherwise the gate would not be blocked off by the bottom plate upon completion of the injection cycle. Accordingly, a gate of relatively small diameter must be employed thus requiring higher injection velocities. In practice, the injected stream of reaction mixture strikes the forward or toe portion of the mold cavity and is reflected backward. Thus, there are simultaneously two superimposed streams of liquid within the mold cavity which result in the formation of a pressure differential, i.e., a venturi. This venturi tends to trap air in the reaction mixture which will show up in the ski-boot shell as air bubbles or voids beneath the surface of the molded article. Such bubbles are highly undesirable since they affect the cosmetic appearance and mechanical strength of the final product. As high a rejection percentage as 60 percent and generally a rejection percentage of from 10 to 30 percent has resulted from the use of such molds.

Moreover, as the two streams become mixed, older reaction material combines with younger reaction material. These materials possess different chemical and physical properties and often lead to the appearance of streaks in the molded product.

Accordingly, it is desirable and advantageous to employ molding apparatus and processes for the liquid injection molding of resins and in particular for thermosetting resins such as the polyurethanes, which avoid or substantially mitigate turbulence within the mold cavity during the injection cycle and provide molded articles which possess few, if any, entrapped air bubbles and any other mechanical or cosmetic defects.

SUMMARY OF THE INVENTION

The instant invention provides an improvement in apparatus for the liquid injection molding of multi-component thermosetting reaction mixtures having holding tanks for storing each component of the reaction mixture under vacuum, recirculating and metering pumps for recirculating each component to its respective holding vessel between injection cycles and alternately delivering metered amounts of each component to a mixing and injecting unit during the injection cycle and a mold having an internal configuration or cavity conforming to the surfaces of the article to be molded, a movable bottom plate and an injection port and short injection channel terminating in a gate positioned within the mold cavity at a point relatively remote from the geometric center or point of balance of the bottom plate for molding the reaction mixture to the desired configuration, the improvement comprising:

a. means for continuously recirculating one part of each reaction component to its respective holding tank while simultaneously delivering the other part of the reaction component to a metering, mixing, and injecting unit for injecting a predetermined amount of homogeneous reaction mixture into the injection port of a mold under substantially constant pressure only for the duration of the injection cycle;

b. means for permitting discharge of the reaction mixture from the metering, mixing, and injecting unit into the injection port of the mold only for the duration of the injection cycle;

c. means for maintaining substantially constant pressure for that part of the reaction component being recirculated to its respective holding tank regardless of the state of operation of means (b); and d. at least one injection channel extending from the injection port of the mold and terminating in at least one gate positioned within the mold cavity at a point relatively proximate to the geometric center or point of balance of the bottom plate, the injection channel being defined within the wall of the mold cavity at a level below the upper surface of the bottom plate when the bottom plate is in the position for the commencement of the injection cycle with the bottom plate wall serving as one wall of the injection channel, or the injection channel is defined within the bottom plate wall with the wall of the mold cavity serving as one wall of the injection channel, or the injection channel is defined within the wall of the mold cavity and the bottom plate wall in the aforesaid manner with the flow of reaction mixture through the gate during the injection cycle being uninterrupted when the bottom plate is in position for the commencement of the injection cycle and interrupted when the bottom plate is in the position at the conclusion of the injection cycle.

In operation, the improved liquid injection molding apparatus of this invention completely eliminates the surge associated with systems heretofore known.

Moreover, the mold employed in the apparatus of this invention provides for the injection of thermosetting resin reaction mixtures proximate to the geometric center of the bottom plate thus eliminating the venturi effect created within known molds.

The mold of this invention also permits an equivalent amount of reaction mixture to be injected into the mold over a given period of time at lower injection velocities than can be accomplished with known molds, since a larger diameter gate can be employed, and conversely, permits an equivalent amount of reaction material to be injected into the mold at the same injection velocity but within a shorter period of time than can be accomplished with known molds when the diameter of the respective gates are equal. This advantage permits the use of a wider range of catalysts in the reaction mixture.

Products manufactured by the mold of this invention are uniformly consistent in cosmetic appearance and mechanical properties since the problems noted in connection with the use of known molds have been eliminated or substantially mitigated.

It has also been observed that the entrainment of air in the molded product can be reduced, but not completely eliminated, in known and conventional molds by providing the bottom plate with a baffle, the baffle being defined upon the upper surface of the bottom plate and positioned a short distance away from the sprue. Injected reaction mixture is intercepted by the baffle and deflected rearward. This arrangement has been found to result in a reduction of the number of air bubbles or voids in the finished molded product.

Accordingly, it is also within the scope of this invention to provide the bottom plate known and conventional molds with baffling means to deflect the flow path of injected reaction mixture.

DESCRIPTION OF THE PREFERRED EMBODIMENTS

FIG. 1 illustrates the apparatus of this invention only as to one component. The apparatus shown would be essentially duplicated for a two component reaction mixture, triplicated for a three component reaction mixture, and so forth, until such point in the apparatus as will be hereinafter indicated.

Figure 1A:
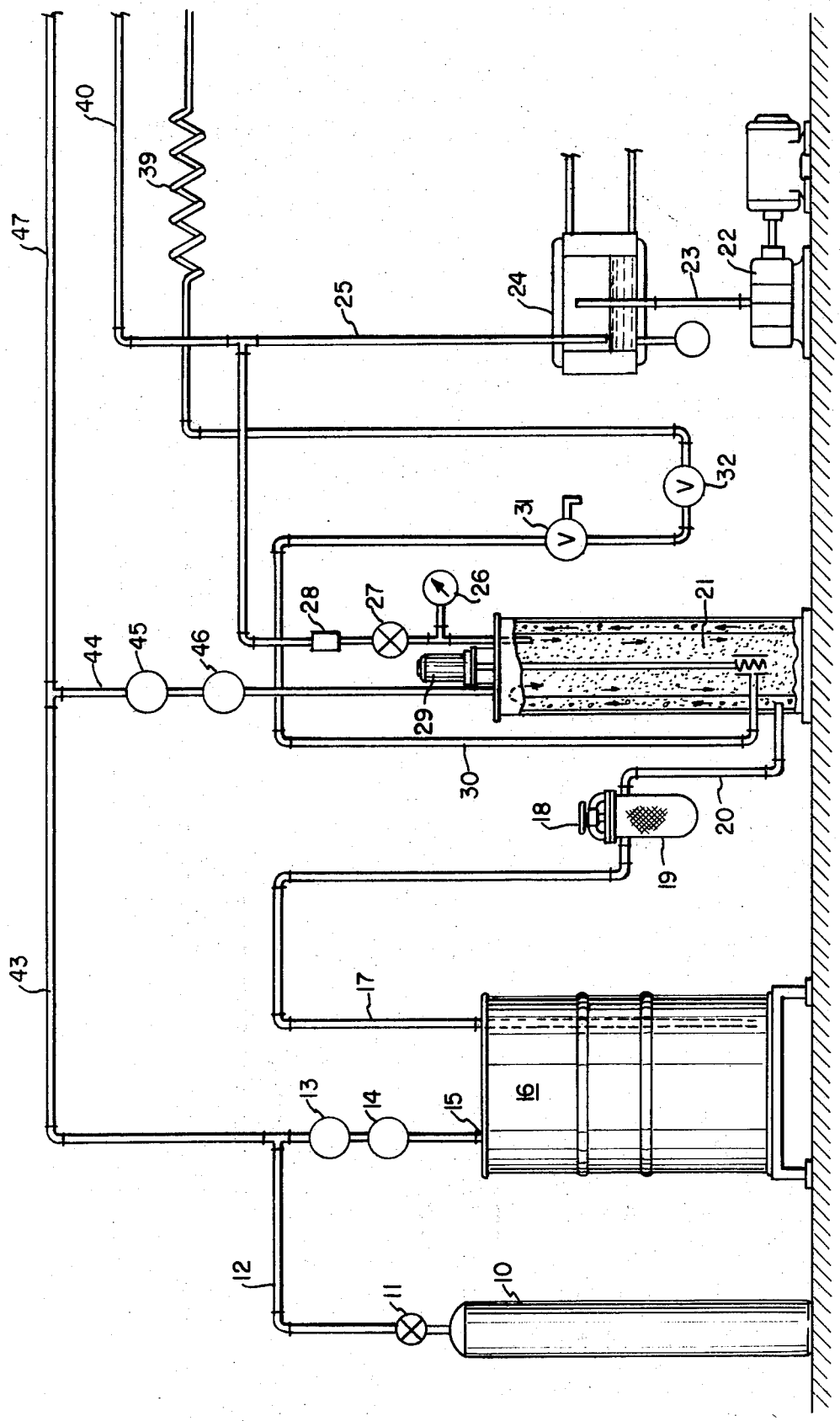
FIG. 1A and 1B are diagrammatic views of a liquid injection molding apparatus according to this invention.

In FIG. 1A, a cylinder 10 of inert gas such as nitrogen gas is fed at a pressure of less than about 3 atmospheres, the pressure being regulated by valve 11, into line 12 with a portion of the flow being directed through gas pressure control valve 13 and safety valve 14 with a drum 15 of one of the components of a polyurethane elastomer mixture. In this case, the reaction component is a prepolymer 16 which has been preheated by any suitable means, e.g., within a steam cabinet or by an immersion heater/paddle stirrer assembly, to about 50°–60° or any such temperature as will provide sufficiently low viscosity for convenient handling.

The inert gas performs various functions: if a prepolymer is employed, moisture will be excluded from the drum thus preventing premature reaction of the free isocyanate groups; if a polyol is employed, the inert gas excludes moisture which, if present, would have an adverse effect on the polyurethane reaction; and, the inert gas pressure helps feed the reaction component to a degasser.

Prepolymer 16 is then fed through line 17 to filter 18 having an 0.8 mm screen 19 to remove any dirt which may be present in the material. The filtered prepolymer is then fed through line 20 to a thin film degasser 21. The arrows therein indicate the direction of flow of the prepolymer. Vacuum pump 22 which draws a maximum vacuum of about $10^{-2}$ mm Hg and advantageously, maintains a vacuum of about 1 to 5 mm Hg, communicates with degasser 21 and is connected via line 23 with condensor 24 which condenses any readily condensable gas coming from degasser 21 through line 25 past vacuum meter 26, valve 27 and sightglass 28. Motor/pump assembly 29 delivers the degassed prepolymer through line 30, past check valve 31, cut-off valve 32 and automatic valve 33 to holding tank 34. Valve 33 is regulated by volume level controls 35 and 36. Level control 37 is a safeguard which interrupts injection cycle when material level is below safe margin. The distance between 35 and 36 can be adjusted as desired but it is generally advantageous to maintain a distance corresponding to a volume of about 5 to 10 liters. When the volume of prepolymer 16 has fallen to 36, additional prepolymer is fed into holding tank 34 until the level has reached 35; in the event the volume level falls below 37, the entire system is shut down. Excess prepolymer is removed from holding tank 34 through line 38. Heating means, e.g., a resistance coil 39, wrapped around line 30 heats the prepolymer to 80°–90°C or to whatever operational temperature is desired. Vacuum pump 22 communicates with holding tank 34 by way of line 40, sightglass 41, and valve 42. As with degasser 21, any readily condensable gas withdrawn from holding tank 34 is condensed in condensor 24. Upon completion of production, the vacuum in degasser 21 and holding tank 34 is broken by a flow of inert gas from cylinder 10 and the apparatus kept under inert gas pressure of from about 0.05 to 0.01 atmospheres in order to prevent moisture from infiltrating the system. The flow of inert gas to the degasser proceeds through line 43 and thereafter through line 44 past gas pressure control valve 45 and manometer 46. The flow of inert gas to the holding tank proceeds through line 43 and thereafter through line 47 past gas pressure control valve 48 and manometer 49.

Holding tank 34 possesses an exit line 50 slightly above the bottom in order to prevent any solid matter which may be present from entering the recirculating portion of the apparatus. Line 50 externally of the holding tank becomes line 51 and leads to a gear pump 52. Prepolymer 16 stored in holding tank 34 is under vacuum and therefore the only force acting upon it to convey it through lines 50 and 51 to gear pump 52 is its own weight. If the rate of flow of liquid away from pump 52 exceeds the rate of flow of liquid to the pump, interrupted flow will result. Accordingly, the internal diameter of lines 50 and 51 must be at least sufficient to provide a sufficient rate of flow of prepolymer to pump 52. In place of lines 50 and 51, pump 52 can be positioned within holding tank 34 but this arrangement is less preferred than the one illustrated.

Pump 52 discharges the prepolymer through line 53, past manometer 54 and through filter 55 which is similar to filter 18. The flow of prepolymer is divided at T connection 56 with one part being recirculated through line 57 past pressure control valve 58 and check valve 59 to holding tank 34. Vacuum meter 60 registers the vacuum within holding tank 34. The other part of the prepolymer is directed through line 61, past manometer 62 to mixing and metering unit 63. Line 65 feeds the second reaction mixture component, a polyol, and line 66 feeds the third reaction mixture component, a color concentrate, into mixing and metering unit. As many individual components as make up the reaction package are fed separately as hereinabove indicated to unit 63. The individual streams of reaction components are then combined in the mixing chamber of mixing and metering unit 63.

Mixing and metering unit 63 is in operation only for the duration of an injection cycle. A mold is generally shown at 64. Upon completion of the injection cycle, a valve within mixing and metering unit 63 closes causing a slight pressure buildup sensed by pressure control valve 58 which responds to the increased pressure by providing a sufficiently greater recirculation flow rate. Similarly, during the injection cycle, the valve within mixing and metering unit 63 opens causing a slight decrease in pressure sensed by pressure control valve 58 which responds by decreasing the recirculation flow rate to the desired extent. Advantageously, the feed rate of each reaction component supply system should be about 100 percent greater than the feed rate of mixing and metering unit 63. The metering pump within unit 63 is advantageously positioned as close to the mixing screw as possible in order to avoid any surge. In order for the metering and mixing unit to work at the lowest pressure, it is advantageous to position T connection 56 as near to the metering pump in unit 63 as construction permits.

The aforedescribed apparatus and manner in which it is employed can with obvious modifications also be advantageously used with prepolymer fed directly from drum 15 to holding tank 34 and recirculated under normal pressure or with degassed prepolymer recirculated to tank 34 under normal pressure.

Figure 2:
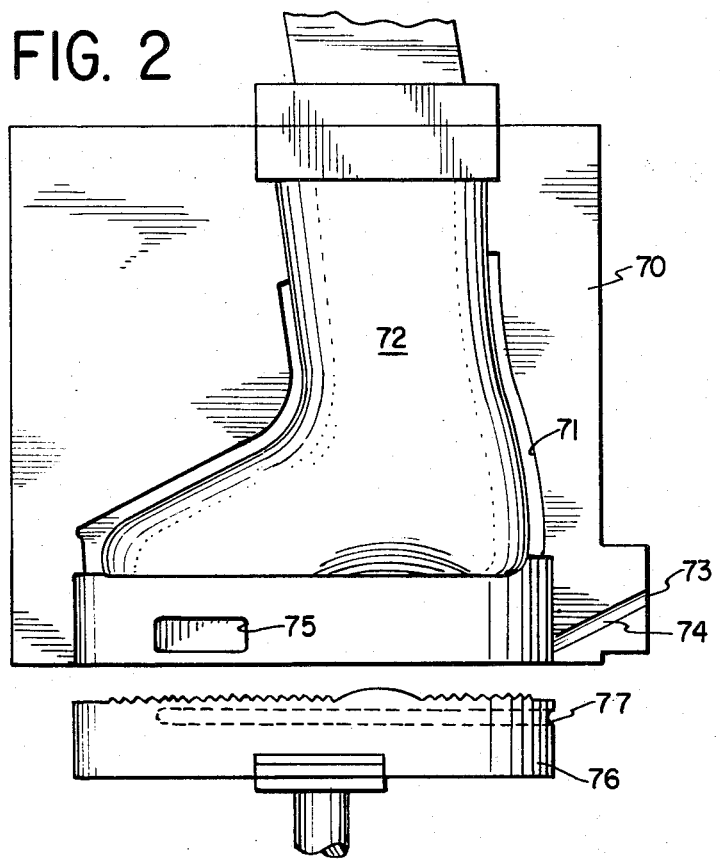
FIG. 2 is an exploded view of the interior of a mold-half according to this invention showing, in addition, the last and bottom plate.

Referring to FIG. 2, 70 represents a mold-half according to this invention in which the mold cavity 71 is in the shape of a ski-boot. Last 72 is shown in place within the mold. Injection port 73 receives the injected polyurethane reaction mixture which then travels via injection channel 74 into the cavity of the mold. A gate 75 is defined within the wall of the mold and is positioned proximate to the geometric center of bottom plate 76 when the latter is in the injection cycle position. Bottom plate 76 possesses an injection channel 77 defined in the wall thereof and is moved upward within the mold by any suitable means, e.g., hydraulic or mechanical, upon completion of the injection cycle. It is understood that channel 77 can alternatively be defined within the wall of the mold cavity, or within the bottom plate, or within both the wall of the mold cavity and the wall of the bottom plate.

Figure 3:
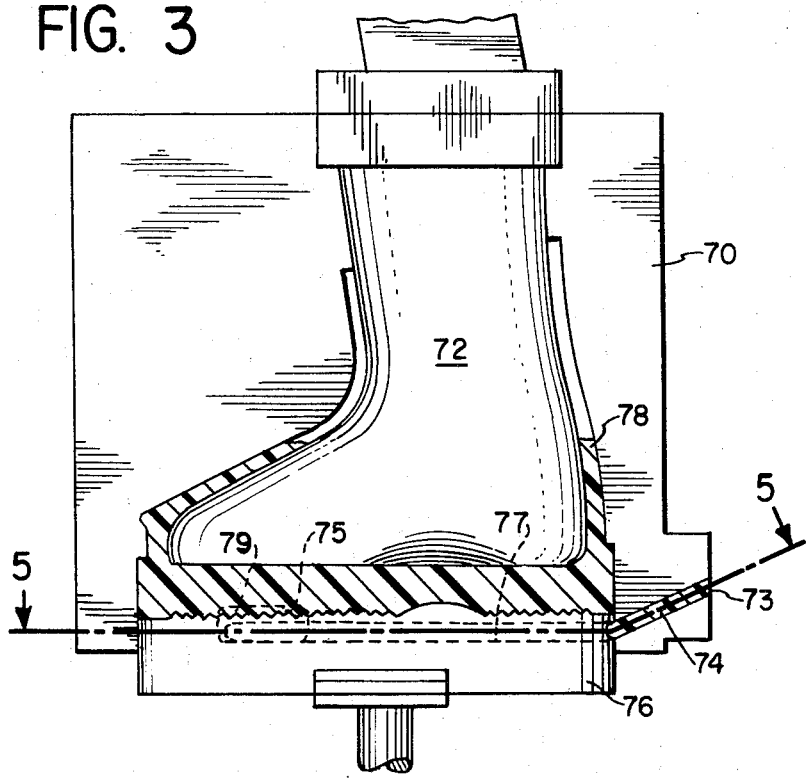
FIG. 3 is a view of the mold of FIG. 2 showing the bottom plate in the lower or injection-cycle position with the required amount of injected reaction mixture partially filling the mold.

Referring to FIG. 3, bottom plate 76 is in the injection cycle position. The polyurethane reaction mixture 78 enters the injection port 73 and proceeds along the length of injection channels 14 and 77 to gate 75. the flow path of mixture 98 is indicated by the line 5—5. Mixture 78 enters the mold through open portion 79 of gate 75. Normally, the upper portion of the mold cavity remains empty at the conclusion of the injection cycle.

Figure 4:
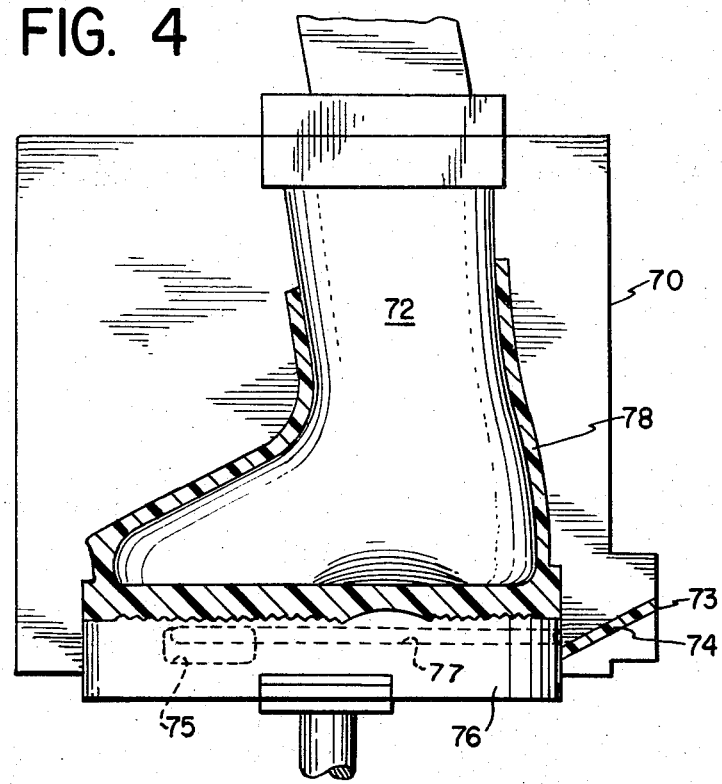
FIG. 4 is a view of the mold of FIG. 2 showing the bottom plate in the upper or curing-cycle position with the injected reaction mixture completely filling the mold.

Referring to FIG. 4, the bottom plate 76 is in the curing cycle position, having been moved upward in the mold by a suitable means. In moving upward, the bottom plate forces polyurethane reaction mixture into the upper portion of the mold cavity to completely fill the cavity and at the same time, blocks off gate 75, thereby preventing the injection of any additional reaction mixture into the mold or conversely preventing loss of any material from the mold. The minimum distance through which the bottom plate must travel to seal the mold will correspond to that required to completely block gate 75. This distance can be greater or lesser than the diameter of injection channel 74.

Figure 5:
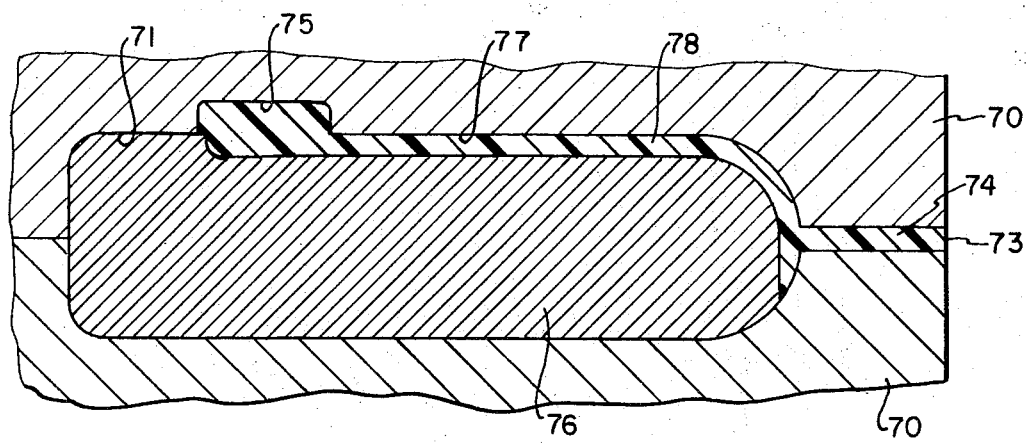
FIG. 5 is a section along the line 4—4 of FIG. 3 showing the gate defined in the interior wall of a mold-half and the greater length of the injection channel defined within the bottom plate wall.

FIG. 5 illustrates the path of the reaction mixture 78 through the injection port 73, along injection channel 74, defined by the two mold-halves, injection channel 77 defined in the wall of the bottom plate, and finally, into the mold cavity through gate 75.

Figure 6:
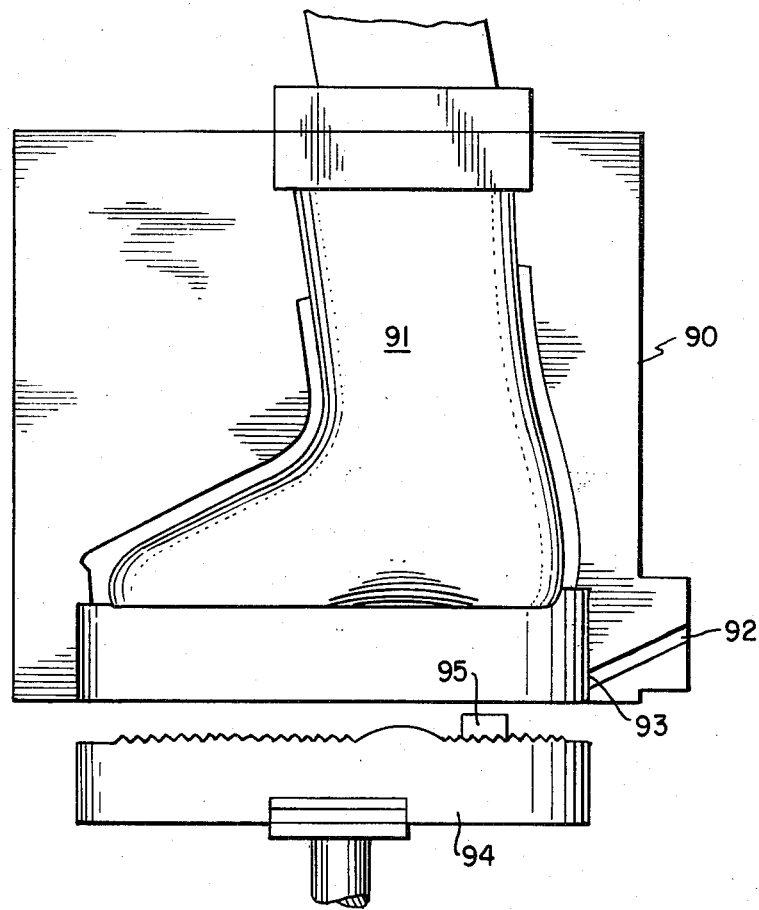
FIG. 6 is an exploded view of the interior of a known and conventional mold-half with the upper surface of the bottom plate modified in accordance with this invention.

FIG. 6 shows a known and conventional mold-half 90 with last 91 in place. Injection channel 92 terminates at gate 93. Bottom plate 94 has been modified in accordance with the present invention by being provided with a baffle 95 which, during the injection cycle, intercepts and deflects injected reaction mixture in a rearward direction thus reducing air-entraining turbulence within the mold.

Figure 1B:
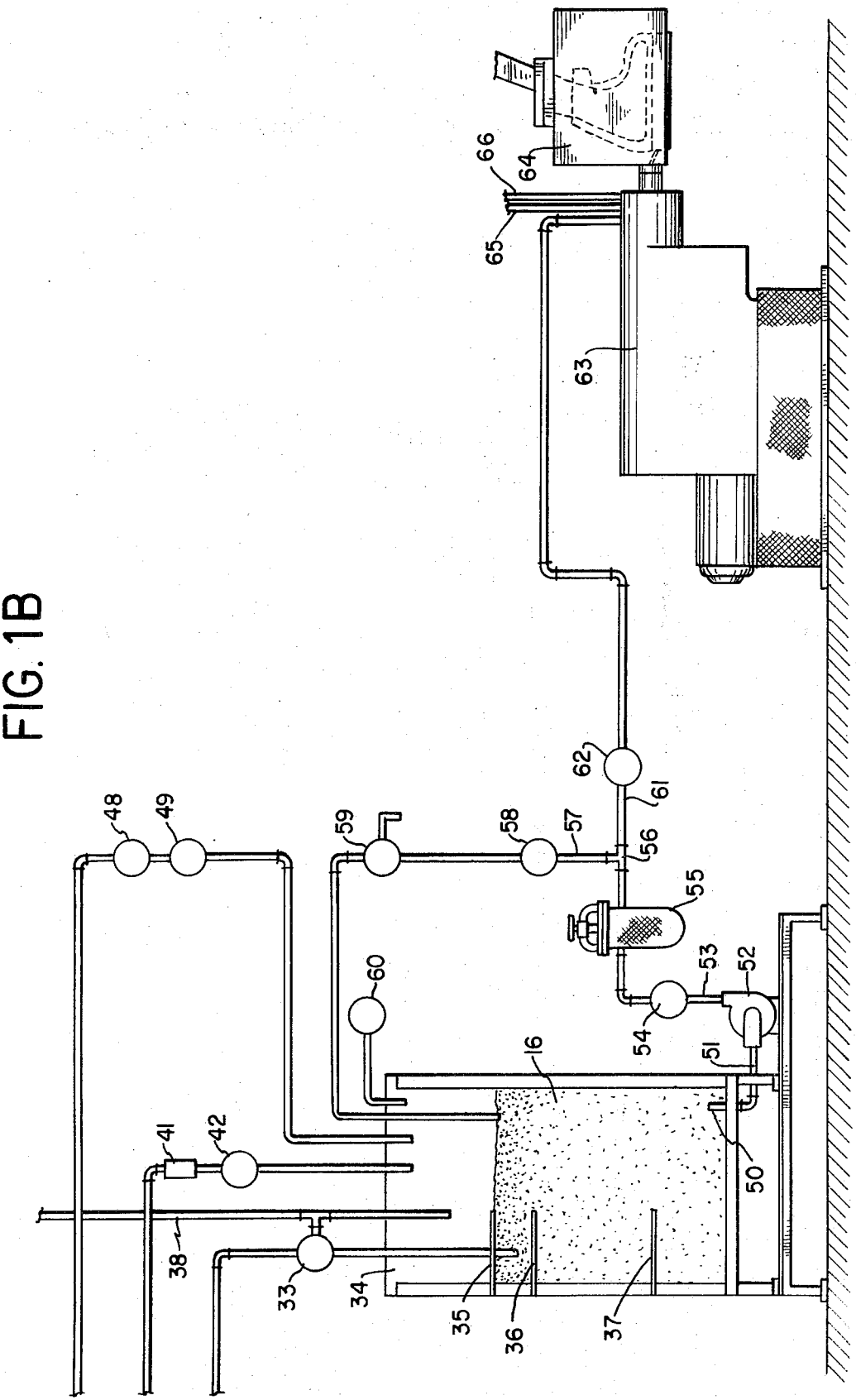

The reaction mixture supply apparatus of FIG. 1A and 1B and the molds of FIG. 2 to 6 can be employed independently of each other with advantageous results. When combined, the supply apparatus and molds herein complement each other's advantages.

Advantageously, the mixing and injecting unit is of a type such as the one manufactured by the German firm, Desma, having a mixing screw speed in excess of 10,000 r.p.m. It is also advantageous to employ the polyurethane elastomer liquid reaction mixtures of commonly assigned U.S. patent application Ser. No. 351,968 and the catalyst system of commonly assigned U.S. patent application Ser. No. 351,859, both applications being filed of even date herewith and incorporated by reference herein.

It is also within the scope of this invention to provide a valve means, for example, associated with gate 75 which will interrupt the flow of reaction mixture into the mold. In this way, bottom plate 76 need not be moved in order to cut off the flow of liquid into the mold.

We claim:

1. An apparatus for the liquid injection molding of multi-component thermosetting reaction mixtures having holding tanks for storing each component of the reaction mixture under vacuum, recirculating and metering pumps for recirculating each component to its respective holding vessel between injection cycles and alternately delivering metered amounts of each component to a mixing and injecting unit during the injection cycle and a mold having an internal configuration or cavity conforming to the surfaces of the article to be molded, a movable bottom plate and an injection port and short injection channel terminating in a gate positioned within the mold cavity at a point relatively remote from the geometric center or point of balance of the bottom plate from molding the reacting mixture to the desired configuration, wherein the improvement comprises:

a. means for continuously recirculating one part of each reaction component to its respective holding tank while simultaneously delivering the other part of the reaction component to a metering, mixing and injecting unit for injecting a predetermined amount of homogeneous reaction mixture into the injection port of a mold under substantially constant pressure only for the duration of the injection cycle;

b. means for permitting discharge of the reaction mixture from the metering, mixing, and injecting unit into the injection port of the mold only for the duration of the injection cycle;

c. means for maintaining substantially constant pressure for that part of the reaction component being recirculated to its respective holding tank regardless of the state of operation of means (b); and d. means for intercepting and deflecting the flow path of the reaction mixture injected into the mold, said means being positioned upon the upper surface of the bottom plate a short distance from the gate.

2. An apparatus for the liquid injection molding of multi-component thermosetting reaction mixtures having holding tanks for storing each component of the reaction mixture under vacuum, recirculating and metering pumps for recirculating each component to its respective holding vessel between injection cycles and alternately delivering metered amounts of each component to a mixing and injecting unit during the injection cycle and a mold having an internal configuration or cavity conforming to the surfaces of the article to be molded, a movable bottom plate and an injection port and short injection channel terminating in a gate positioned within the mold cavity at a point relatively remote from the geometric center or point of balance of the bottom plate for molding the reaction mixture to the desired configuration, wherein the improvement comprises:
   a. means for continuously recirculating one part of each reaction component to its respective holding tank while simultaneously delivering the other part of the reaction component to a metering, mixing and injecting unit for injecting a predetermined amount of homogenous reaction mixture into the injection port of a mold under substantially constant pressure only for the duration of the injection cycle;
   b. means for permitting discharge of the reaction mixture from the metering, mixing, and injecting unit into the injection port of the mold only for the duration of the injection cycle;
   c. means for maintaining substantially constant pressure for that part of the reaction component being recirculated to its respective holding tank regardless of the state of operation of means (b); and
   d. at least one injection channel extending from the injection port of the mold and terminating in at least one gate positioned within the mold cavity at a point relatively proximate to the geometric center or point of balance of the bottom plate, the injection channel being defined within the wall of the mold cavity at a level below the upper surface of the bottom plate when the bottom plate is in the position for the commencement of the injection cycle with the bottom plate wall serving as one wall of the injection channel, with the flow of reaction mixture through the gate during the injection cycle being uninterrupted when the bottom plate is in position for the commencement of the injection cycle and interrupted when the bottom plate is in the position at the conclusion of the injection cycle.

3. The apparatus of claim 1 wherein means for interrupting the flow of additional reaction material through the gate without displacing the bottom plate from the injection cycle position is provided.

4. The apparatus of claim 1 wherein the mixing and injecting unit possesses a high speed mixing screw capable of speeds in excess of 10,000 r.p.m.

5. An apparatus for the liquid injection molding of multi-component thermosetting reaction mixtures having holding tanks for storing each component of the reaction mixture under vacuum, recirculating and metering pumps for recirculating each component to its respective holding vessel between injection cycles and alternately delivering metered amounts of each component to a mixing and injecting unit during the injection cycle and a mold having an internal configuration or cavity conforming to the surfaces of the article to be molded, a movable bottom plate and an injection port and short injection channel terminating in a gate positioned within the mold cavity at a point relatively remote from the geometric center or point of balance of the bottom plate for molding the reaction mixture to the desired configuration, wherein the improvement comprises:
   a. means for continuously recirculating one part of each reaction component to its respective holding tank while simultaneously delivering the other part of the reaction component to a metering, mixing and injecting unit for injecting a predetermined amount of homogenous reaction mixture into the injection port of a mold under substantially constant pressure only for the duration of the injection cycle;
   b. means for permitting discharge of the reaction mixture from the metering, mixing, and injecting unit into the injection port of the mold only for the duration of the injection cycle;
   c. means for maintaining substantially constant pressure for that part of the reaction component being recirculated to its respective holding tank regardless of the state of operation of means (b); and
   d. at least one injection channel extending from the injection port of the mold and terminating in at least one gate positioned within the mold cavity at a point relatively proximate to the geometric center or point of balance of the bottom plate, the injection channel being defined within the bottom plate wall with the wall of the mold cavity serving as one wall of the injection channel, with the flow of reaction mixture through the gate during the injection cycle being uninterrupted when the bottom plate is in position for the commencement of the injection cycle and interrupted when the bottom plate is in the position at the conclusion of the injection cycle.

6. An apparatus for the liquid injection molding of multi-component thermosetting reaction mixtures having holding tanks for storing each component of the reaction mixture under vacuum, recirculating and metering pumps for recirculating each component to its respective holding vessel between injection cycles and alternately delivering metered amounts of each component to a mixing and injecting unit during the injection cycle and a mold having an internal configuration or cavity conforming to the surfaces of the article to be molded, a movable bottom plate and an injection port and short injection channel terminating in a gate positioned within the mold cavity at a point relatively remote from the geometric center or point of balance of the bottom plate for molding the reaction mixture to the desired configuration, wherein the improvement comprises:
   a. means for continuously recirculating one part of each reaction component to its respective holding tank while simultaneously delivering the other part of the reaction component to a metering, mixing and injecting unit for injecting a predetermined amount of homogenous reaction mixture into the injection port of a mold under substantially constant pressure only for the duration of the injection cycle;
   b. means for permitting discharge of the reaction mixture from the metering, mixing, and injecting unit into the injection port of the mold only for the duration of the injection cycle;
   c. means for maintaining substantially constant pressure for that part of the reaction component being recirculated to its respective holding tank regardless of the state of operation of means (b); and
   d. at least one injection channel extending from the injection port of the mold and terminating in at least one gate positioned within the mold cavity at a point relatively proximate to the geometric center or point of balance of the bottom plate, the injection channel being defined as the cooperation of two half-channels, one half-channel being disposed within the wall of the mold cavity at a level below the upper surface of the bottom plate when the bottom plate is in the position for the commencement of the injection cycle, the other half-channel being disposed within the wall of the bottom plate, with the flow of reaction mixture through the gate during the injection cycle being uninterrupted when the bottom plate is in position for the commencement of the injection cycle and interrupted when the bottom plate is in the position at the conclusion of the injection cycle.

* * * * *